US009097134B2

(12) United States Patent
Ferch et al.

(10) Patent No.: US 9,097,134 B2
(45) Date of Patent: Aug. 4, 2015

(54) AIR COOLING DESIGN FOR TAIL-CONE GENERATOR INSTALLATION

(75) Inventors: Gordon Ferch, Etobicoke (CA); Daniel Alecu, Toronto (CA); Xiaoliu Liu, Mississauga (CA); Barry Barnett, Markham (CA); Dileepan Sivalingam, Mississauga (CA); Carmine Forgione, Toronto (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 637 days.

(21) Appl. No.: 13/616,230

(22) Filed: Sep. 14, 2012

(65) Prior Publication Data

US 2014/0079530 A1   Mar. 20, 2014

(51) Int. Cl.
*F02C 7/12*   (2006.01)
*F01D 15/10*  (2006.01)

(52) U.S. Cl.
CPC . *F01D 15/10* (2013.01); *F02C 7/12* (2013.01); *Y02T 50/671* (2013.01); *Y02T 50/675* (2013.01)

(58) Field of Classification Search
CPC ......... F01D 15/10; F02C 7/12; Y02T 50/671; Y02T 50/675
USPC .............................. 60/802, 39.08, 226.1, 266
See application file for complete search history.

(56) References Cited

U.S. PATENT DOCUMENTS

| 2,826,895 | A | * | 3/1958 | English ........................... 60/266 |
| 3,693,880 | A | * | 9/1972 | Versaw et al. .............. 239/127.3 |
| 4,271,666 | A | * | 6/1981 | Hurley et al. .................... 60/266 |
| 5,020,318 | A | * | 6/1991 | Vdoviak ....................... 60/226.1 |
| 5,372,006 | A | * | 12/1994 | Lair .............................. 60/226.2 |
| 5,655,359 | A | | 8/1997 | Campbell et al. |
| 6,092,360 | A | | 7/2000 | Hoag et al. |
| 6,378,293 | B1 | * | 4/2002 | Care et al. .................... 60/226.1 |
| 6,584,766 | B1 | * | 7/2003 | Czachor ......................... 60/266 |
| 6,868,664 | B2 | | 3/2005 | Albero et al. |
| 7,364,117 | B2 | | 4/2008 | Dionne |
| 7,841,163 | B2 | | 11/2010 | Welch et al. |
| 2008/0041033 | A1 | * | 2/2008 | Durocher et al. ............ 60/226.1 |
| 2009/0000304 | A1 | * | 1/2009 | Anderson et al. ............... 60/262 |
| 2010/0275572 | A1 | * | 11/2010 | Durocher et al. ............ 60/39.08 |
| 2011/0036068 | A1 | * | 2/2011 | Lefebvre et al. ............... 60/262 |

* cited by examiner

*Primary Examiner* — Ted Kim
(74) *Attorney, Agent, or Firm* — Norton Rose Fulbright Canada LLP

(57) ABSTRACT

A system for cooling a generator mounted in the tail-cone of an engine. The system comprises a fairing, which receives through an inlet thereof air from a bypass duct and directs the bypass air towards a cavity of the tail-cone for cooling the generator. The bypass air is then expelled through an outlet of a support strut positioned in fluid communication with the tail-cone cavity. The fairing inlet and the strut outlet are both positioned in a plane substantially perpendicular to a longitudinal plane of the engine. In this manner, circulation of the bypass air through the fairing, the tail-cone cavity, and the strut may be achieved. The bypass air directed through the fairing further enables cooling of service lines accommodated in the fairing. A lobe mixer is further used to direct the fairing and shield the latter from core exhaust.

15 Claims, 6 Drawing Sheets

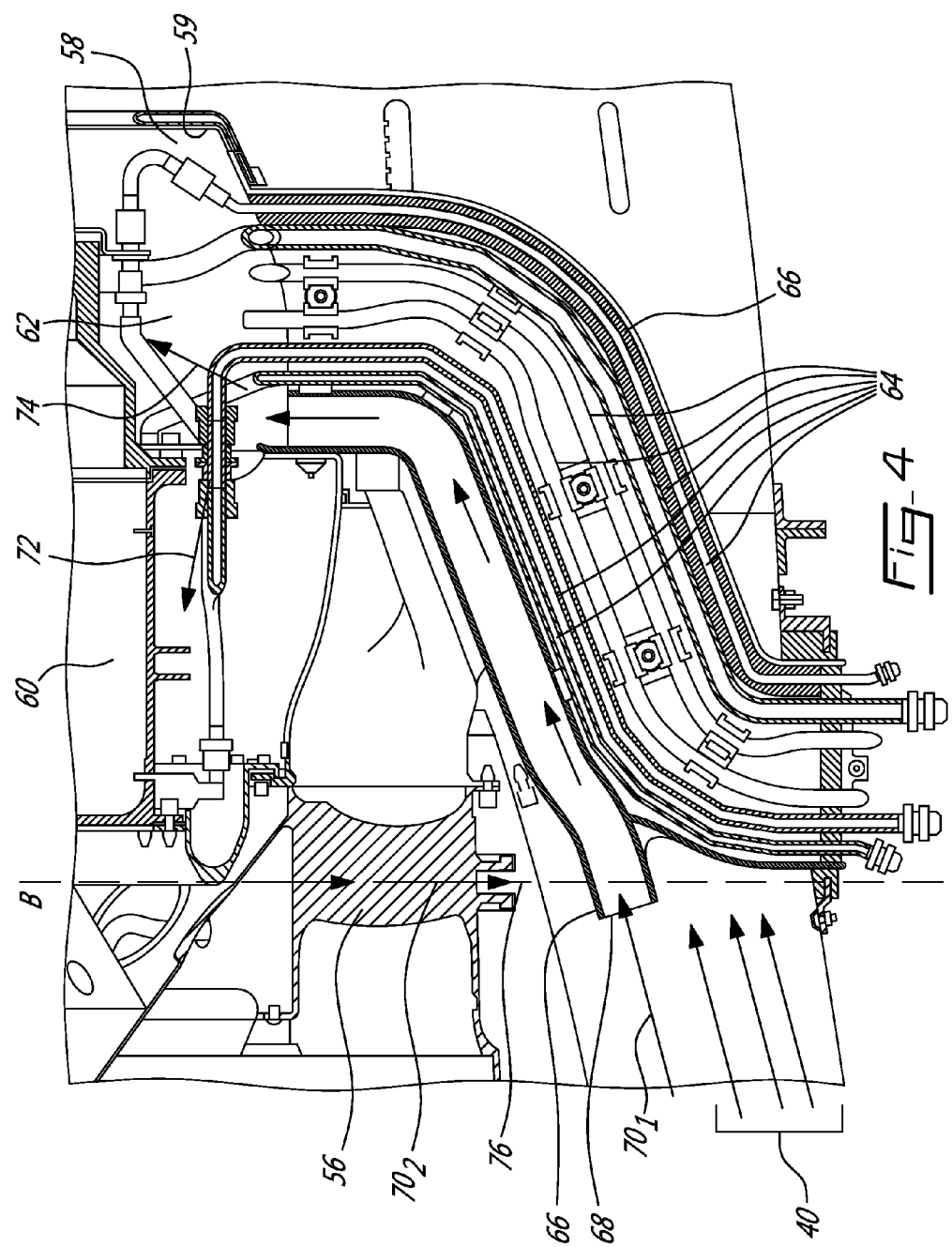

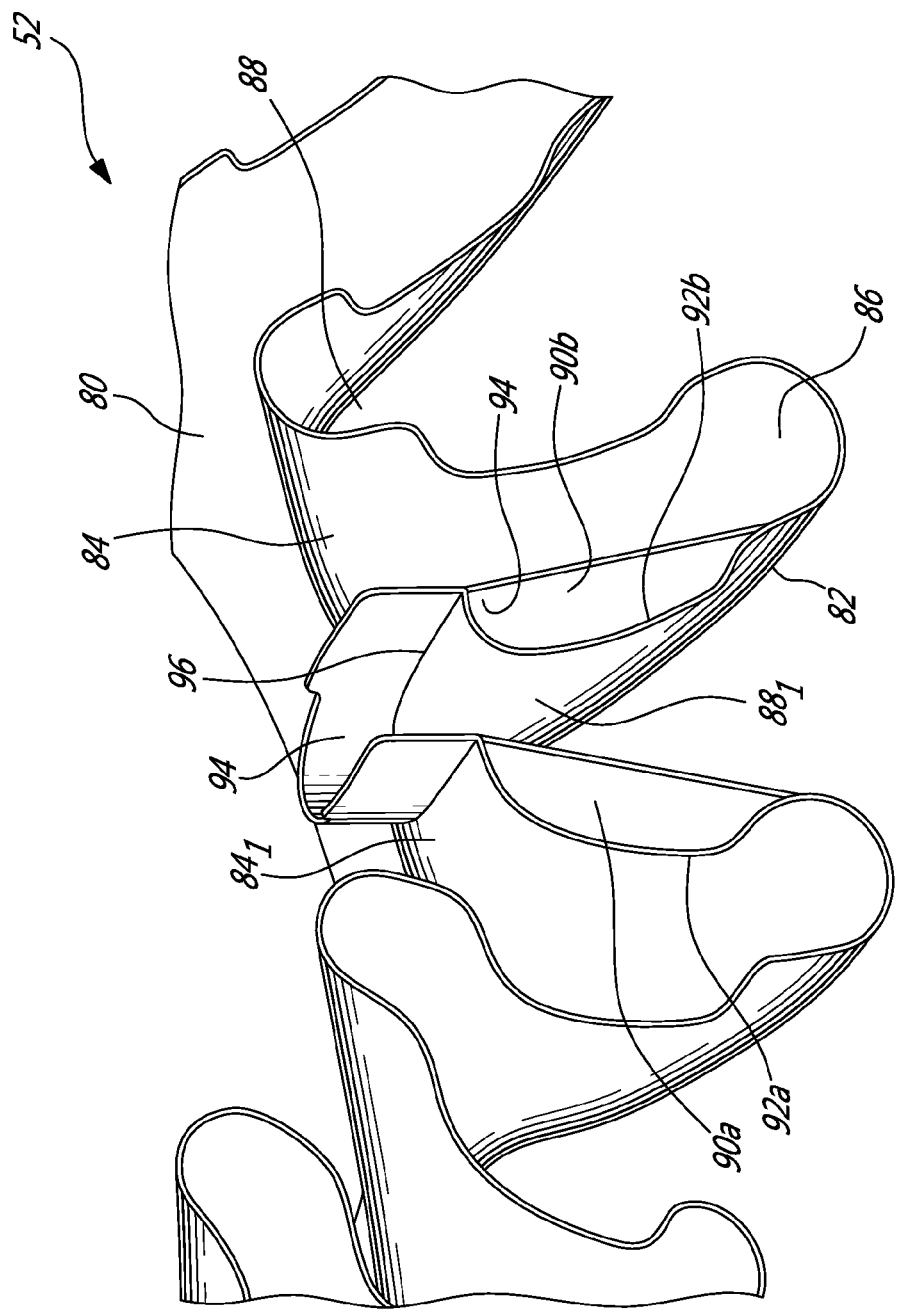

AIR COOLING DESIGN FOR TAIL-CONE GENERATOR INSTALLATION

TECHNICAL FIELD

The application relates generally to a system and method for cooling a tail-cone mounted generator.

BACKGROUND OF THE ART

One or more generators may be positioned in the tail-cone of an engine to provide additional electrical power during normal engine operating conditions as well as emergency situations. However, an engine tail-cone may be quite hot and, thus, in order to ensure proper operation of the generator(s), it is desirable to provide a cooling system to ensure that the temperature of the generator remains acceptable despite being subjected to high temperature flows. Still, known cooling systems usually require installation of additional components in the engine system and may therefore add to the weight and complexity of the engine, in addition to increasing aerodynamic drag.

There is therefore a need for an improved system and method for cooling a tail-cone mounted generator.

SUMMARY

In one aspect, there is provided a system for cooling a generator mounted in a cavity of an engine tail-cone, the engine comprising a casing having the tail-cone coupled thereto, a core compartment within the casing, and an intake for drawing air into the casing, the system comprising a bypass passage defined between the casing and the core compartment, the bypass passage adapted to divert a bypass portion of the air therethrough; at least one fairing coupled to the tail-cone in fluid communication with the bypass passage and the tail-cone cavity, the at least one fairing configured to direct the bypass portion of the air towards the tail-cone cavity; and a support strut coupled to the casing in fluid communication with the bypass passage and the tail-cone cavity and adapted to expel the bypass portion of the air from the tail-cone cavity towards the bypass passage.

In another aspect, there is provided a method for cooling a generator mounted in a cavity of an engine tail-cone, the engine comprising a casing having the tail-cone coupled thereto, a core compartment within the casing, and an intake for drawing air into the casing, the method comprising diverting a bypass portion of the air through a bypass passage defined between the casing and the core compartment; directing the bypass portion of the air through at least one fairing in fluid communication with the bypass passage and the tail-cone cavity and towards the tail-cone cavity; and expelling the bypass portion of the air from the tail-cone cavity and towards the bypass passage through a support strut in fluid communication with the bypass passage and the tail-cone cavity.

In a further aspect, there is provided a system for cooling a generator mounted in a cavity of an engine tail-cone, the engine comprising a casing having the tail-cone coupled thereto, a core compartment within the casing, and an intake for drawing air into the casing, the method comprising means for diverting a bypass portion of the air through a bypass passage defined between the casing and the core compartment; means for directing the bypass portion of the air through at least one fairing in fluid communication with the bypass passage and the tail-cone cavity and towards the tail-cone cavity; and means for expelling the bypass portion of the air from the tail-cone cavity and towards the bypass passage through a support strut in fluid communication with the bypass passage and the tail-cone cavity.

DESCRIPTION OF THE DRAWINGS

Reference is now made to the accompanying figures in which:

FIG. 4 is a partial schematic cross-sectional view of the fairing of FIG. 3;

FIG. 5a is a perspective view of the lobe mixer of FIG. 3; and

FIG. 5b is a cross-sectional view of the fairing of FIG. 3 routed through a cold lobe of the lobe mixer of FIG. 5a.

DETAILED DESCRIPTION

Figure 1:
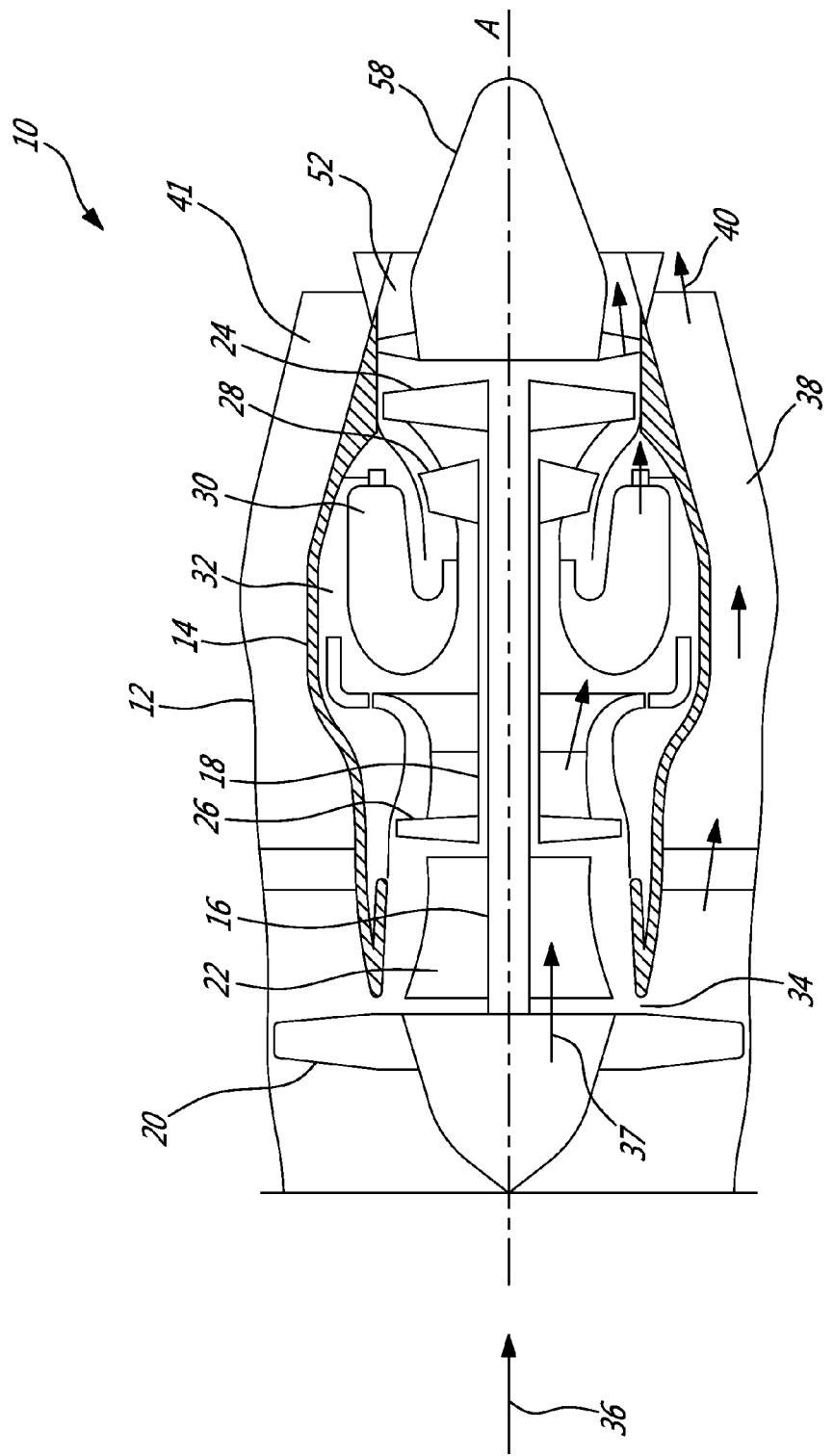
FIG. 1 is a schematic cross-sectional view of a gas turbine engine, in accordance with an illustrative embodiment.

Referring to FIG. 1, a turbofan gas turbine engine 10 of a type typically provided for use in subsonic flight and presented for illustrative purposes, includes a housing or nacelle 12, a core casing or Turbine Exhaust Case (TEC) 14, a low pressure spool assembly seen generally at 16, and a high pressure spool assembly seen generally at 18. The low pressure spool assembly 16 includes a fan assembly 20, a low pressure compressor assembly 22, and a low pressure turbine assembly 24. The high pressure spool assembly 18 includes a high pressure compressor assembly 26 and a high pressure turbine assembly 28. the core casing 14 surrounds the low and high pressure spool assemblies 16 and 18 in order to define a main fluid path (not shown) therethrough. In the main fluid path, there is provided a combustor 30 to constitute a gas generator section 32.

The core casing 14 defines with the low pressure compressor assembly 22 a low pressure compressor inlet 34 for receiving a portion of ambient air 36. A portion 37 of the air 36 is then compressed by the fan assembly 20 and further by the low pressure compressor assembly 22 and the high pressure compressor assembly 26. The compressed air 37 is then forced into the combustor 30. A mixture of the compressed air 37 and fuel injected by a fuel injecting means (not shown) generates combustion gases for rotating the low and high pressure turbine assemblies 24 and 28 and powering the low and high pressure compressor assemblies 22 and 26 and the fan assembly 20. A radial spacing between the nacelle 12 and the core casing 14 further defines an annular bypass duct or passage 38, which permits a portion 40 of the air 36 to bypass the engine 10. As such, the bypass air 40 is illustratively at a lower temperature than the hot exhaust flowing through the core casing 14 and discharging from the combustor 30. Due to the radial symmetry of the engine 10 relative to the engine axis A, a second bypass duct 41 is illustratively provided above the engine axis A.

Figure 2:
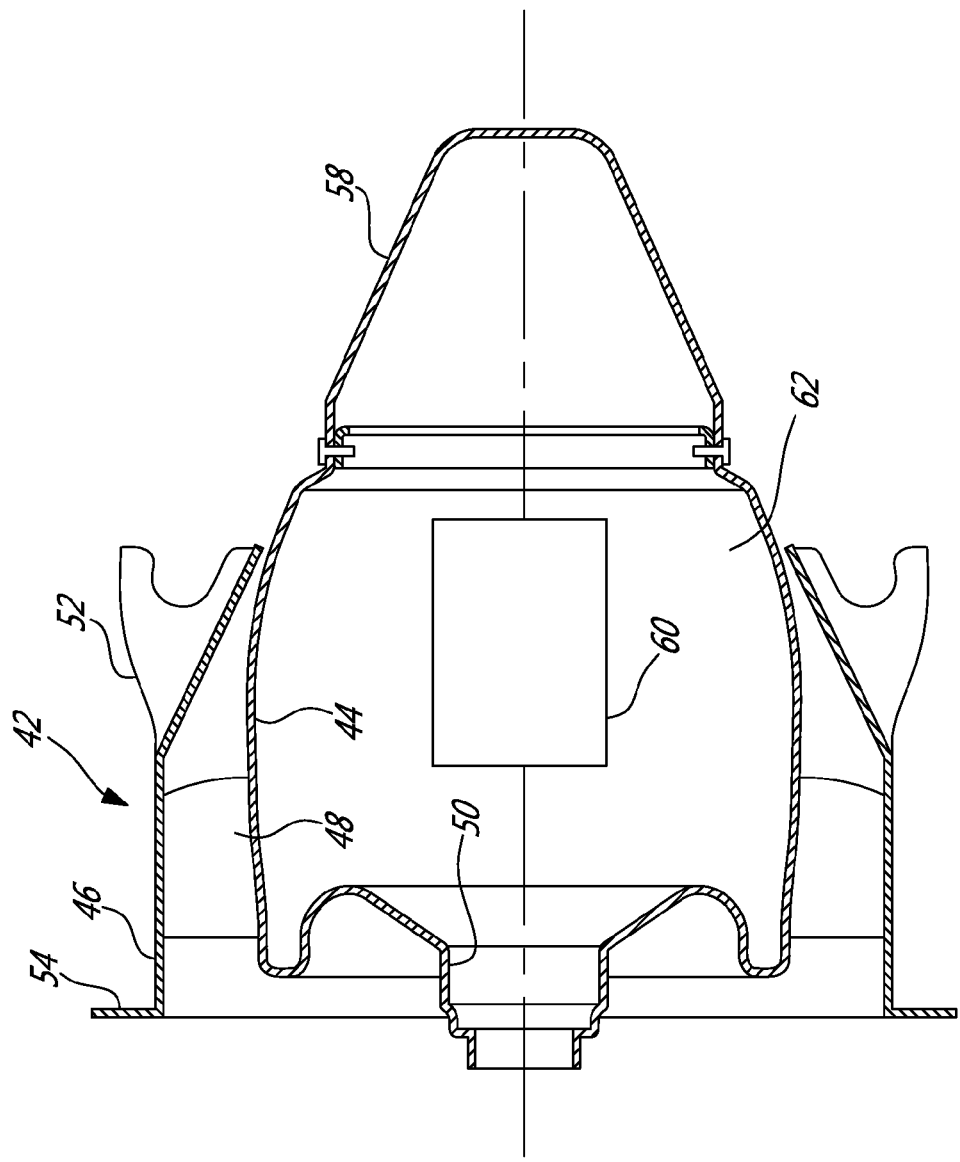
FIG. 2 is a schematic cross-sectional view of a tail-cone of the gas turbine engine of FIG. 1.

Referring to FIG. 2 in addition to FIG. 1, the gas turbine engine 10 further includes an annular turbine exhaust duct 42 attached to the core casing 14. The core casing 14 illustratively comprises an annular inner case 44 and an annular outer case 46. A plurality of circumferentially spaced apart airfoils 48 extend radially between the inner and outer cases 44, 46 to thereby structurally connect same. A bearing housing 50 is co-axially connected to the inner case 44 for supporting an aft end of a main shaft (not shown) of the low pressure spool assembly 16. A lobe mixer 52 is illustratively installed in the exhaust duct 42 and attached to the rear end of the outer case 46 to mix the core exhaust flow with the bypass flow from the bypass duct 38. A mounting flange 54 may further be integrated with the outer case 46 at a front end thereof for securing the annular turbine exhaust duct 42 to the engine core casing 14. The engine core casing 14 is in turn structurally connected to the nacelle 12 through a plurality of radially extending support struts (reference 56 in FIG. 3) positioned within the annular bypass duct 38.

A tail-cone 58 may further be attached to a rear end of the inner case 44 of the annular turbine exhaust duct 42 to cover an opening defined by the rear end of the inner case 44 and thus provide an aerodynamic fairing. A generator 60 may be arranged within a cavity 62 of the tail-cone 58 and driven by the low pressure spool assembly 16. It may therefore be desirable to insulate the generator 60 from the core exhaust flow from the exhaust duct 42.

Figure 3:
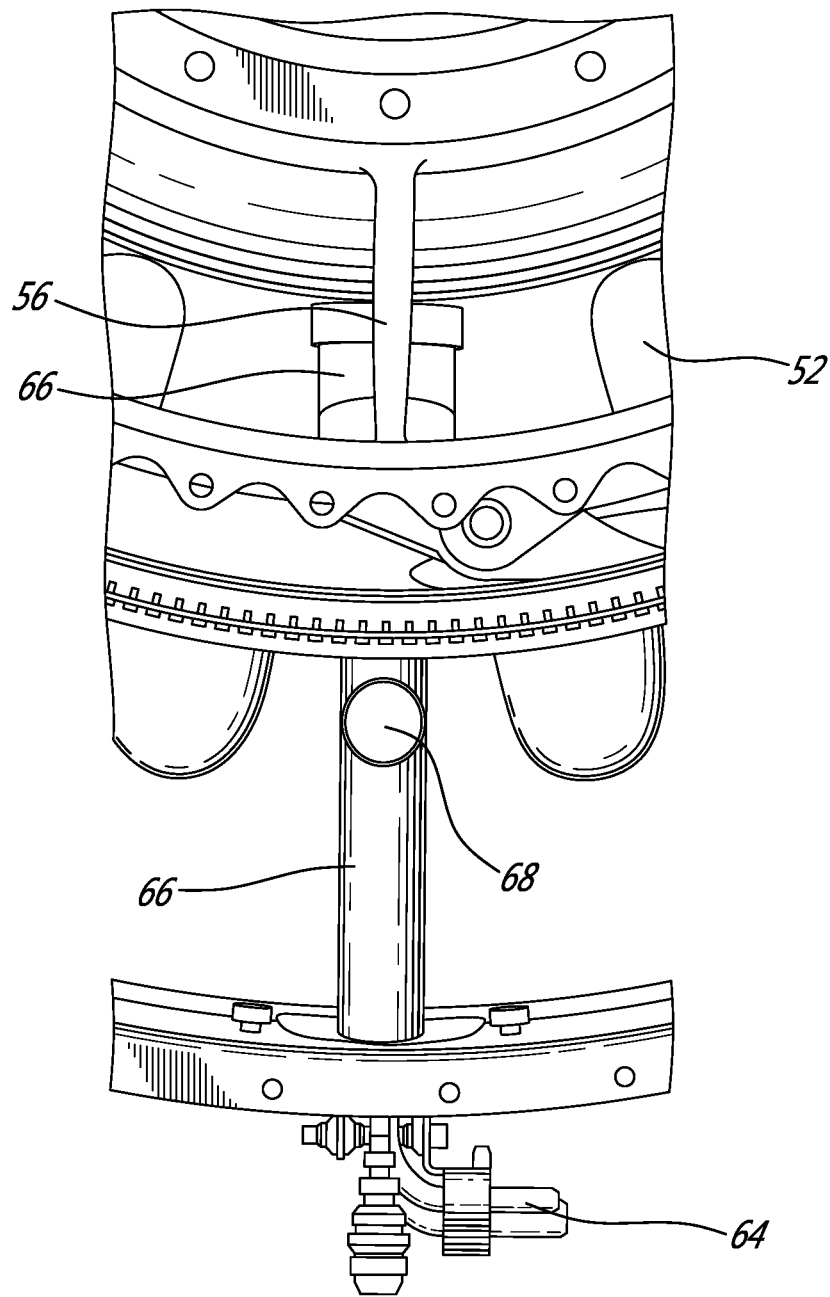
FIG. 3 is a top perspective view of a fairing routed through a lobe mixer, in accordance with an illustrative embodiment.

Referring to FIG. 3, generator services 64, such as electrical cables or other lines used for servicing the engine 10 and/or aircraft (not shown), are illustratively routed through at least one fairing 66 spanning across the bypass duct 38. The fairing 66 may comprise a fairing inlet 68 and illustratively provides an aerodynamic shape around the services 64. The fairing 66 may indeed be provided with an increased sweep angle to form an S-shape. With such a shape, the fairing's relative thickness, which is the ratio between the maximum thickness of the fairing 66 in the direction extending transversely to the flow divided by the dimension that the fairing 66 occupies in the longitudinal direction of the flow, may be reduced. Thus, overall parts count and weight of the engine 10 may be lowered in addition to decreasing aerodynamic drag. It should be understood that, due to the radial symmetry of the engine 10 relative to the engine axis A of FIG. 1, a pair of fairings 66 may be used, with each fairing 66 being provided on either side of, i.e. above or below, the engine axis A. The fairings 66 may then be in fluid communication with respective ones of the bypass ducts 38 and 41. It should also be understood that more than two fairings as in 66 may be used on either side of the engine axis A, the number of fairings 66 varying according to the desired cooling effect to be achieved.

Referring to FIG. 3 and FIG. 4, a portion $70_1$ of the bypass duct air 40 flowing through the annular bypass duct 38 illustratively enters through the fairing inlet 68 and flows into the fairing 66 towards the tail-cone cavity 62. Once the stream of air $70_1$ reaches the tail-cone cavity 62, the stream $70_1$ illustratively separates into at least two air streams 72 and 74 and flows around the tail-cone mounted generator 60 for cooling thereof. The air streams 72 and 74 may then recombine into the air stream $70_2$, which passes through the hollow strut 56 and exits at an outlet 76 to meet the bypass duct air 40. A cooling circuit is thus illustratively created for cooling the tail-cone mounted cavity 62 and the generator 60. The cooling circuit may also supplement a conventional oil cooling system, which may be used to cool the generator 60.

In order to enable the cooling air $70_1$ to flow through the fairing 66 and the generator 60, a pressure differential may be achieved between the fairing inlet 68 and the outlet 76. For this purpose, the outlet 76 is illustratively positioned in the same plane B, which is shown in cross-section on FIG. 4, as the fairing inlet 68. The plane B is illustratively perpendicular to the longitudinal plane (not shown) of the engine 10, the longitudinal plane being shown in cross-section as axis A on FIG. 1. With the fairing inlet 68 and outlet 76 both positioned in the plane B, the air $70_1$ entering the fairing 66 at the inlet 68 may be at the same static pressure as the air $70_2$ exiting the strut 56 at the outlet 76. The static pressure illustratively represents the pressure of still air and is measured perpendicular to the surface of the aircraft (not shown), and accordingly of the engine 10. By ensuring that both the fairing inlet 68 and the outlet 76 are at the same static pressure, reverse air flow may be prevented. In particular, a reverse flow of the cooling air $70_2$ into the strut 56, through the tail-cone cavity 62, and into the fairing 66 may be prevented.

The flow of cooling air $70_1$, $70_2$ may further be driven by the difference between the total air pressure and the static air pressure, namely the ram or dynamic pressure created by the motion of the aircraft (not shown). The ram pressure may indeed result from the movement of the air through the fairing 66 and the tail-cone cavity 62. With the fairing inlet 68 and the outlet 76 at the same static pressure, circulation of the cooling air $70_1$, $70_2$ may simply be achieved by the aircraft's movement during flight and complexity of the cooling system may therefore be reduced.

Referring to FIG. 5a in addition to FIG. 4, the lobe mixer 52 illustratively comprises a body 80 defining inner or hot lobes 82 and outer or cold lobes 84. The lobes 82 and 84 may be used for directing and mixing flows of hot air from the exhaust duct 42 and flows of cold air from the bypass duct 38. Indeed, the hot lobes 82 illustratively define outer open-ended channels or chutes 86 for transferring the high-speed hot core exhaust into the low-speed bypass duct air 40. The cold lobes 84 illustratively define inner open-ended channels or chutes 88 for transferring the bypass duct air 40 into the hot core exhaust. Merging and mixing of the hot and cold air streams can therefore be achieved. As flow velocity is proportional to temperature, this may in turn reduce the speed of the core exhaust and increase the speed of the bypass flow, thereby making the distribution of the ejected air streams uniform. The overall perceived noise level may accordingly be lowered since noise produced by the engine 10 increases with increased relative difference in velocity between the core and bypass flows.

The fairing 66 may be routed through a cold lobe $84_1$, which illustratively directs the bypass duct air 40 towards the core exhaust. In order to shield the fairing 66 from direct impingement of the hot core exhaust, the distal portion (not shown) of the lobe $84_1$ may be extended. For this purpose, the lobe $84_1$ may comprise a pair of opposite shields 90a and 90b, which extend axially away from opposite side edges 92a and 92b of the chute $88_1$. A shield 94 may also be provided, which extends radially away from a middle edge 96 of the chute $88_1$. Provision of both shields 90a, 90b, and 94 illustratively increases the coverage and heat insulation provided by the cold lobe $84_1$. The fairing 66 run through the lobe $84_1$ may therefore be better shielded from the hot core exhaust, and heat transfer to the cooling air $70_1$ routed through the fairing 66 may be reduced. A cooler environment may thus be provided inside the fairing 66 as the latter crosses the hot core airflow.

Since a plurality of fairings as in 66 may be provided for cooling the generator 60, it should be understood that more than one cold lobe as in $84_1$ may be adapted to route a fairing 66 therethrough. As such, although only the cold lobe $84_1$ has been illustrated as comprising shields 90a, 90b, and 94, it should be understood that a plurality of the cold lobes 84 may comprise shields 90a, 90b, and 94.

Figure 5B:
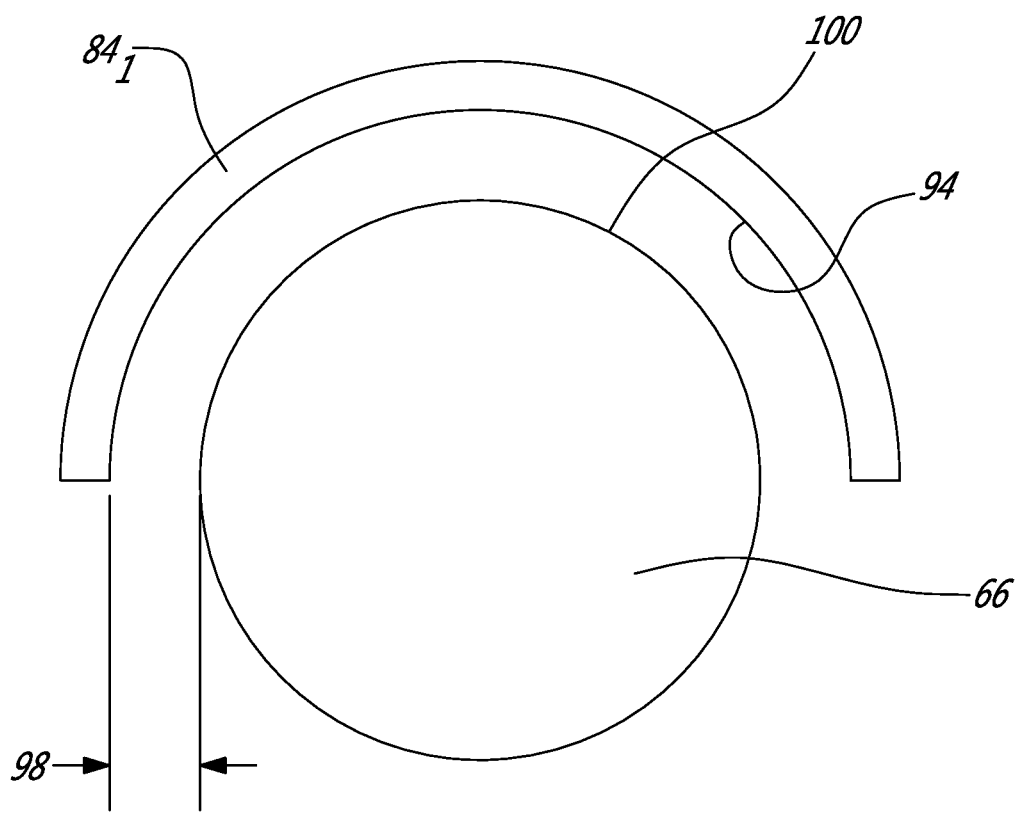

Referring to FIG. 5b, a cooler environment may further be maintained inside the fairing 66 by provision of a spacing 98 between an outer surface 100 of the fairing 66 and the inner surface 94 of the lobe $84_1$ when the fairing 66 is positioned within the cold lobe $84_1$. Indeed, despite the hot core exhaust impinging on the lobe $84_1$, air within the spacing 98 between the lobe $84_1$ and the outer surface 100 of the fairing 66 illustratively remains at a temperature which is intermediate between the temperature of the core exhaust and the temperature of the cooling air flowing through the fairing 66. As a result, heat transfer from the core exhaust to the cooling air may be lowered.

The fairing 66 thus illustratively acts as a physical barrier by shielding the generator services 64 from the surrounding core exhaust. In addition, the cooling air $70_1$ flowing through the fairing 66 may reduce direct hot air impingement on the generator services 64 and maintain a cool environment around the generator services 64. As electrical resistance and losses increase with increased temperature, cooling the environment surrounding the generator services 64 may enable smaller gauge wires to be used for the generator services 64. The current carrying capability of generator power feeder cables (not shown) and other cables constituting the generator services 64 may also be increased by routing such cables through the cooled fairing 66. The loading on the generator 60 may in turn be increased. As such, the overall weight and envelope of the fairing arrangement 66 and of the generator services 64 may be reduced.

Heat transfer within the tail-cone cavity 62 between the cooling air $70_1$ and the hot exhaust air may further be prevented by the double-walled structure of the tail-cone 58. Thermal induced stress may indeed be reduced by attaching the faring 66 to an inner wall (59) of the tail-cone 58. Since core exhaust illustratively impinges on the outer wall (not shown) of the tail-cone 58, the inner wall may remain cooler than the outer wall (not shown). Thus, coupling the fairing 66 to the inner wall may improve heat insulation of the air $70_1$ routed through the fairing 66, and thus ultimately enhance the cooling effect achieved by the fairing 66.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A system for cooling a generator mounted in a cavity of an engine tail-cone, the engine comprising a casing having the tail-cone coupled thereto, a core compartment within the casing, and an intake for drawing air into the casing, the system comprising:
   a bypass passage defined between the casing and the core compartment, the bypass passage adapted to divert a bypass portion of the air therethrough;
   at least one fairing coupled to the tail-cone in fluid communication with the bypass passage and the tail-cone cavity, the at least one fairing configured to direct the bypass portion of the air towards the tail-cone cavity through an inlet positioned in a plane substantially orthogonal to a longitudinal plane of the engine; and
   a support strut coupled to the casing in fluid communication with the bypass passage and the tail-cone cavity and adapted to expel the bypass portion of the air from the tail-cone cavity towards the bypass passage via an outlet positioned in the plane substantially orthogonal to a longitudinal plane of the engine, thereby exposing the inlet of the at least one fairing and the outlet of the support strut to a same level of static pressure.

2. The system of claim 1, wherein the at least one fairing is adapted to accommodate therein a plurality of lines for servicing the engine and further wherein the bypass portion of the air routed through the at least one fairing enables cooling of the plurality of lines.

3. The system of claim 1, further comprising a lobe mixer coupled to the tail-cone in fluid communication with the bypass passage and the core compartment, the lobe mixer having a plurality of lobes for routing the bypass portion of the air towards a portion of the air routed through the core compartment and the at least one fairing being routed within a selected one of the lobes.

4. The system of claim 3, wherein the selected lobe comprises at least one shield for preventing impingement on the fairing of the portion of the air routed through the core compartment.

5. The system of claim 4, wherein the at least one shield comprises a first shield extending axially away from a first side edge of the selected lobe and a second shield extending axially away from a second side edge of the selected lobe opposite to the first side edge.

6. The system of claim 5, wherein the at least one shield comprises a third shield extending radially away from a middle edge of the selected lobe.

7. The system of claim 3, wherein the portion of the air routed through the core compartment impinges on the lobe mixer and an inner surface of the selected lobe is spaced from an outer surface of the at least one fairing for reducing heat transfer between the bypass portion of the air routed through the fairing and the portion of the air impinging on the lobe mixer.

8. The system of claim 1, wherein the tail-cone comprises an inner wall and an outer wall exposed to a portion of the air routed through the core compartment and further wherein the at least one fairing is coupled to the inner wall.

9. A method for cooling a generator mounted in a cavity of an engine tail-cone, the engine comprising a casing having the tail-cone coupled thereto, a core compartment within the casing, and an intake for drawing air into the casing, the method comprising:
   diverting a bypass portion of the air through a bypass passage defined between the casing and the core compartment;
   directing the bypass portion of the air through at least one fairing in fluid communication with the bypass passage and the tail-cone cavity and towards the tail-cone cavity through an inlet positioned in a plane substantially orthogonal to a longitudinal plane of the engine; and
   expelling the bypass portion of the air from the tail-cone cavity and towards the bypass passage through a support strut in fluid communication with the bypass passage and the tail-cone cavity via an outlet positioned in the plane substantially orthogonal to a longitudinal plane of the engine, thereby exposing the inlet of the at least one fairing and the outlet of the support strut to a same level of static pressure.

10. The method of claim 9, further comprising accommodating in the at least one fairing a plurality of lines for servicing the engine, wherein routing the bypass portion of the air through the at least one fairing enables cooling of the plurality of lines.

11. The method of claim 9, further comprising routing the at least one fairing within a selected one of a plurality of lobes of a lobe mixer coupled to the tail-cone in fluid communication with the bypass passage and the core compartment, the plurality of lobes routing the bypass portion of the air towards a portion of the air routed through the core compartment.

12. The method of claim 11, further comprising providing at least one shield on the selected lobe for preventing impingement on the fairing of the portion of the air routed through the core compartment, said portion impinging on the lobe mixer.

13. The method of claim 11, wherein routing the at least one fairing within the selected lobe comprises spacing an inner surface of the selected lobe from an outer surface of the at least one fairing for preventing heat transfer between the bypass portion of the air routed through the fairing and the portion of the air routed through the core compartment.

14. The method of claim 9, further comprising coupling the at least one fairing to an inner wall of the tail-cone.

15. A system for cooling a generator mounted in a cavity of an engine tail-cone, the engine comprising a casing having the tail-cone coupled thereto, a core compartment within the casing, and an intake for drawing air into the casing, the method comprising:

means for diverting a bypass portion of the air through a bypass passage defined between the casing and the core compartment;

means for directing the bypass portion of the air through at least one fairing in fluid communication with the bypass passage and the tail-cone cavity and towards the tail-cone cavity through an inlet positioned in a plane substantially orthogonal to a longitudinal plane of the engine; and means for expelling the bypass portion of the air from the tail-cone cavity and towards the bypass passage through a support strut in fluid communication with the bypass passage and the tail-cone cavity via an outlet positioned in the plane substantially orthogonal to a longitudinal plane of the engine, thereby exposing the inlet of the at least one fairing and the outlet of the support strut to a same level of static pressure.

\* \* \* \* \*